(12) United States Patent
Aboukarr et al.

(10) Patent No.: US 7,583,689 B2
(45) Date of Patent: Sep. 1, 2009

(54) DISTRIBUTED COMMUNICATION EQUIPMENT ARCHITECTURES AND TECHNIQUES

(75) Inventors: Bakri Aboukarr, Kanata (CA); Arkin Aydin, Nepean (CA); Mary Ann Condie, Kanata (CA); Wilfred Sullivan, Ottawa (CA); Andrew Gordon Tomilson, Nepean (CA); Guy Landry, Kanata (CA); Bart Joseph Gerard Pauwels, Tessenderlo (BE); Ronny Jozef Leon Peeters, Hoboken (BE); Koen Hooghe, Antwerpen (BE)

(73) Assignee: Alcatel Lucent, Paris (FR)

( * ) Notice: Subject to any disclaimer, the term of this patent is extended or adjusted under 35 U.S.C. 154(b) by 560 days.

(21) Appl. No.: 11/264,475

(22) Filed: Nov. 1, 2005

(65) Prior Publication Data

US 2007/0100976 A1    May 3, 2007

(51) Int. Cl.
*H04L 12/28* (2006.01)
*H04L 12/56* (2006.01)
*G06F 15/16* (2006.01)

(52) U.S. Cl. .................. 370/420; 370/389; 370/419; 709/249

(58) Field of Classification Search .................. 370/403
See application file for complete search history.

(56) References Cited

U.S. PATENT DOCUMENTS

| | | | |
|---|---|---|---|
| 6,452,946 B1 * | 9/2002 | Manzardo | 370/487 |
| 6,700,881 B1 * | 3/2004 | Kong et al. | 370/335 |
| 6,822,944 B1 * | 11/2004 | Mantin | 370/254 |
| 6,965,558 B1 * | 11/2005 | Hann | 370/216 |
| 6,967,952 B1 * | 11/2005 | Akers et al. | 370/395.1 |
| 7,099,979 B2 * | 8/2006 | Soetemans et al. | 710/300 |
| 7,158,536 B2 * | 1/2007 | Ching et al. | 370/468 |
| 2003/0058847 A1 * | 3/2003 | Pike | 370/360 |
| 2003/0091059 A1 * | 5/2003 | Pike | 370/462 |
| 2003/0153311 A1 * | 8/2003 | Black | 455/436 |
| 2003/0161329 A1 * | 8/2003 | Corey, Jr. | 370/395.64 |
| 2003/0221003 A1 | 11/2003 | Storry | 709/224 |
| 2004/0213147 A1 * | 10/2004 | Wiese et al. | 370/216 |
| 2006/0075343 A1 * | 4/2006 | Henry | 715/704 |

FOREIGN PATENT DOCUMENTS

| | | |
|---|---|---|
| EP | 1 018 851 A2 | 7/2000 |
| EP | 1 176 837 A1 | 1/2002 |
| WO | WO 01/58205 A3 | 8/2001 |
| WO | WO 02/078269 A1 | 10/2002 |
| WO | WO 02/101959 A1 | 12/2002 |

* cited by examiner

*Primary Examiner*—Daniel J Ryman
*Assistant Examiner*—Cassandra Decker

(57) ABSTRACT

Distributed communication equipment architectures and techniques are disclosed. A host system includes an expansion unit through which control information and communication traffic may be exchanged with an expansion system. The expansion system is thereby controllable by a controller at the host system, significantly simplifying the design and reducing the cost of the expansion system. The expansion unit for a host system may also provide one or more configurable communication link interfaces. Each configurable interface may be independently configured as a network-side interface for connection to upstream communication equipment or as an access-side expansion interface for connection to an expansion system, allowing provisioning of network and access interfaces at the host system as needed.

15 Claims, 5 Drawing Sheets

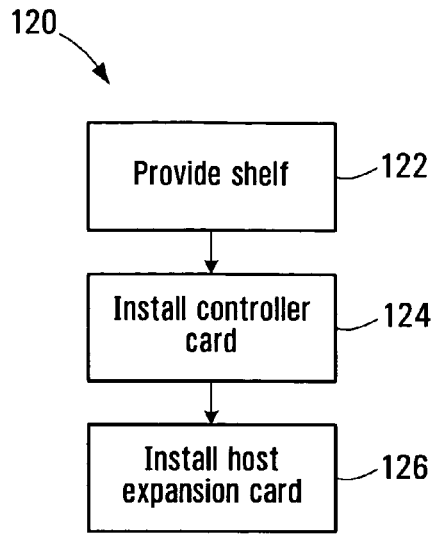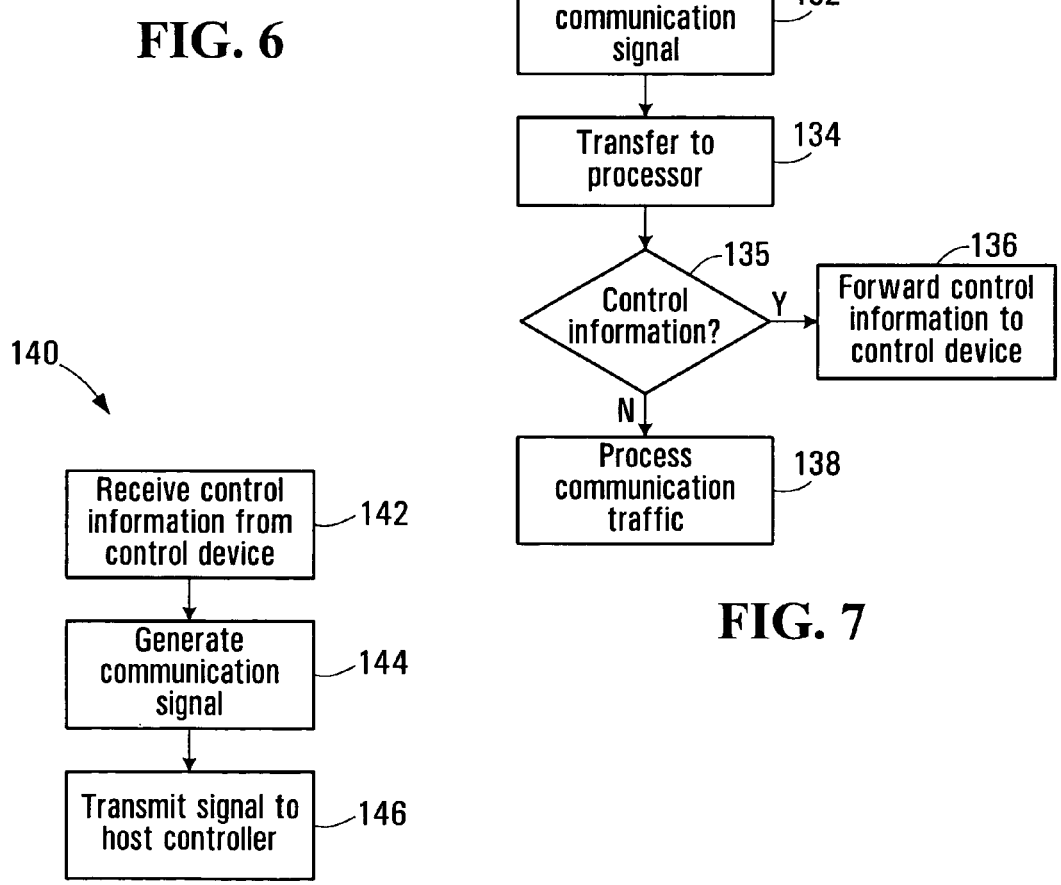
FIG. 6
FIG. 7
FIG. 8

DISTRIBUTED COMMUNICATION EQUIPMENT ARCHITECTURES AND TECHNIQUES

CROSS-REFERENCE TO RELATED APPLICATION

This application is related to the commonly assigned and co-pending U.S. patent application Ser. No. 11/264,451, entitled "REMOTE CONTROL AND CONTROL REDUNDANCY FOR DISTRIBUTED COMMUNICATION EQUIPMENT", filed of even date herewith, the entire contents of which are incorporated herein by reference.

FIELD OF THE INVENTION

This invention relates generally to communications and, in particular, to distributed communication equipment architectures and related techniques.

BACKGROUND

In some types of communication system such as systems for providing Digital Subscriber Line (DSL) services, communication service quality degrades as distance from access communication equipment increases. One possible approach to alleviate this type of problem is to deploy access equipment closer to customers. However, this approach tends to be cost prohibitive in terms of both initial equipment costs and continuing management and maintenance costs.

Distributed system architectures represent a more feasible alternative for moving access functionality toward customer sites. Several distributed system solutions are currently available.

Some communication equipment vendors have launched DSL access products that are primarily scaled down versions of Central Office (CO)-based systems. In these systems, the CO is not actually partitioned. Rather, distributed units are scaled down versions of CO equipment.

According to these solutions, substantial functionality is duplicated instead of being distributed. Each distributed remote unit retains much of the cost, size and power requirements of CO equipment. This increases the cost of an overall system.

A comparable solution in DSL systems is called "loop extension". In this case, the DSL line itself is repeated or carried via some other medium and replicated at a remote location. However, this solution requires not only typical CO equipment, but also repeater equipment, at an overall increase in cost.

Embodiments of the invention provide further improved distributed communication equipment architectures and related techniques, with simpler and less costly distributed components.

SUMMARY OF THE INVENTION

Some embodiments of the invention address the problem of delivering DSL services to a large number of subscribers in a cost effective and scalable manner. A scalable, distributed access node system architecture is provided, and may include one or more host systems connected to respective groups of satellite expansion shelf systems and/or sealed expansion modules (SEMs), which have DSL interfaces to connect to subscriber Customer Premises Equipment (CPE). In one embodiment, the physical layout of the expansion shelf system is identical to that of the host system, so that it can easily be converted to another host system, to satisfy network expansion requirements for instance. This can be an important advantage, for example, to service providers needing an easy and cost effective migration plan for expanding their access networks as their subscriber base grows.

Other embodiments of the invention provide flexibility in the provisioning of communication links of a distributed access node system to be either network links or access links. This flexibility allows network coverage to be expanded in accordance with subscriber demand, which can be particularly important for enhanced DSL services such as so-called "Triple Play" services of Internet, video, and voice, for instance. Both dedicated and configurable interfaces, illustratively Gigabit Ethernet (Gig-E) interfaces, are provided at a host system of the distributed access node system. Configurable interfaces may be useful, for example, to reduce the number of dedicated physical connectors such as Small Form-factor Pluggable (SFP) ports on an electronic circuit card faceplate at the host system, thereby providing cost and space savings.

According to an aspect of the invention, there is provided an apparatus including an interface and an expansion module. The interface enables communication of control information with a controller of communication equipment, and the controller is configurable to exchange control information with a local controllable communication module of the communication equipment. The expansion module is operatively coupled to the interface and is adapted for transferring control information between the controller and a controllable communication module of expansion communication equipment.

The interface may also enable exchange of communication traffic with the expansion module. In this case, the expansion module is further adapted for transferring communication traffic between the communication equipment and the expansion communication equipment.

In some embodiments, the communication equipment exchanges communication traffic with upstream communication equipment through a communication link, and the apparatus also includes an upstream communication link interface for enabling communication with the upstream communication equipment through a further communication link.

The apparatus may also include a configurable communication link interface. The configurable communication link interface is configurable for enabling communication with upstream communication equipment through an upstream communication link or with the expansion communication equipment through an expansion communication link.

Multiple communication link interfaces may be provided, including interfaces of one or more of the following types: an upstream communication link interface for enabling communication with upstream communication equipment through an upstream communication link, a downstream communication link interface for enabling communication with the expansion communication equipment through a downstream communication link, and a configurable communication link interface, the configurable communication link interface being configurable for enabling communication with the upstream communication equipment through an upstream communication link or with the expansion communication equipment through a downstream communication link.

The apparatus may be provided, for example, in a host system of a distributed communication network element. The distributed communication network element may also include an expansion system that includes the expansion communication equipment, and a communication link between the host system and the expansion system.

The host system and the expansion system may include respective equipment shelves having a common structure. Where the host system includes a first electronic circuit card of a first type, including the interface and the expansion module, and a second electronic circuit card of a second type, including the controller, the expansion system is convertible into a host system by installing in the expansion system equipment shelf respective electronic circuit cards of the first and second types.

The expansion system may include a communication link interface operatively coupled to the communication link, and a relay module operatively coupled to the communication link interface and adapted for transferring control information between the host system and the controllable communication module.

According to another aspect of the invention, expansion equipment components are provided in an apparatus that includes a communication link interface for enabling communication with remote communication equipment through a communication link. The remote communication equipment includes a controller that is configurable to exchange control information with a controllable communication module of the remote communication equipment. This apparatus may also include a relay module operatively coupled to the communication link interface and adapted for transferring control information between the controller and a local controllable communication module associated with the communication link interface.

The relay module may also be adapted for transferring communication traffic between the remote communication equipment and the local controllable communication module.

Where the communication link comprises an optical communication link, at least one of the interface and the relay module may include a converter for converting between optical and electrical signals.

In some embodiments, the communication link is a communication network-side communication link, and the local controllable communication module is adapted for communicating communication traffic with an access-side communication link. The access-side communication link provides access to the communication network.

The expansion apparatus may be implemented, for example, as a sealed expansion module.

In accordance with a further aspect of the invention, a method providing a communication equipment shelf that has slots for receiving electronic circuit cards, installing in a first slot of the equipment shelf an electronic circuit card of a first type having a controller, the controller being configurable to exchange control information with a local controllable communication module installed in another slot of the equipment shelf, and installing in a second slot of the equipment shelf an electronic circuit card of a second type having an interface for enabling communication of control information with the controller and an expansion module operatively coupled to the interface and adapted for transferring control information between the controller and a controllable communication module of expansion communication equipment.

The operation of providing may involve providing an expansion communication equipment shelf having installed in the first slot an electronic circuit card of a third type. The third type of electronic circuit card has a communication link interface for enabling communication with remote communication equipment through a communication link. The remote communication equipment has a controller that is configurable to exchange control information with a controllable communication module of the remote communication equipment, and a relay module operatively coupled to the interface and adapted for transferring control information between the controller and a local controllable communication module associated with the communication link interface. In this case, the method may include an additional operation of removing the electronic circuit card of the third type from the first slot.

The remote communication equipment may exchange communication traffic with upstream communication equipment, and one or more of the electronic circuit card of the first type and the electronic circuit card of the second type may provide a communication link interface for enabling communication through a communication link. The method may then include an operation of operatively coupling the communication link interface of the one or more of the electronic circuit card of the first type and the electronic circuit card of the second type to the upstream communication equipment.

Another aspect of the invention provides an apparatus having an expansion module for transferring communication signals between communication equipment and upstream communication equipment, and between the communication equipment and downstream communication equipment, and a plurality of communication link interfaces operatively coupled to the expansion module. The communication link interfaces include a configurable communication link interface that is configurable for enabling communication with either the upstream communication equipment through an upstream communication link or the downstream communication equipment through a downstream communication link.

The communication link interfaces may also include one or more of: a dedicated upstream communication link interface for enabling communication with the upstream communication equipment through a further upstream communication link, and a dedicated downstream communication link interface for enabling communication with the downstream communication equipment through a further downstream communication link.

In one embodiment, the configurable communication link interface is operatively coupled to a pair of switch ports of a switch. The switch has, in addition to the pair of switch ports, further switch ports that are respectively operatively coupled to the plurality of communication link interfaces. The switch is adapted for switching communication signals between upstream switch ports and downstream switch ports. The pair of switch ports coupled to the configurable communication link interface includes an upstream switch port and a downstream switch port.

The apparatus may also include a configurable selector operatively coupled to the configurable interface and to the pair of switch ports, the selector being configurable to operatively couple one switch port of the pair of switch ports to the configurable interface.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings, in which:

FIG. 6 is a flow diagram of a method of converting an expansion system to a host system.

FIG. 7 is a flow diagram of a method transferring control information from a host system to an expansion system.

FIG. 8 is a flow diagram of a method transferring control information from an expansion system to a host system.

DETAILED DESCRIPTION OF PREFERRED EMBODIMENTS

Figure 1:
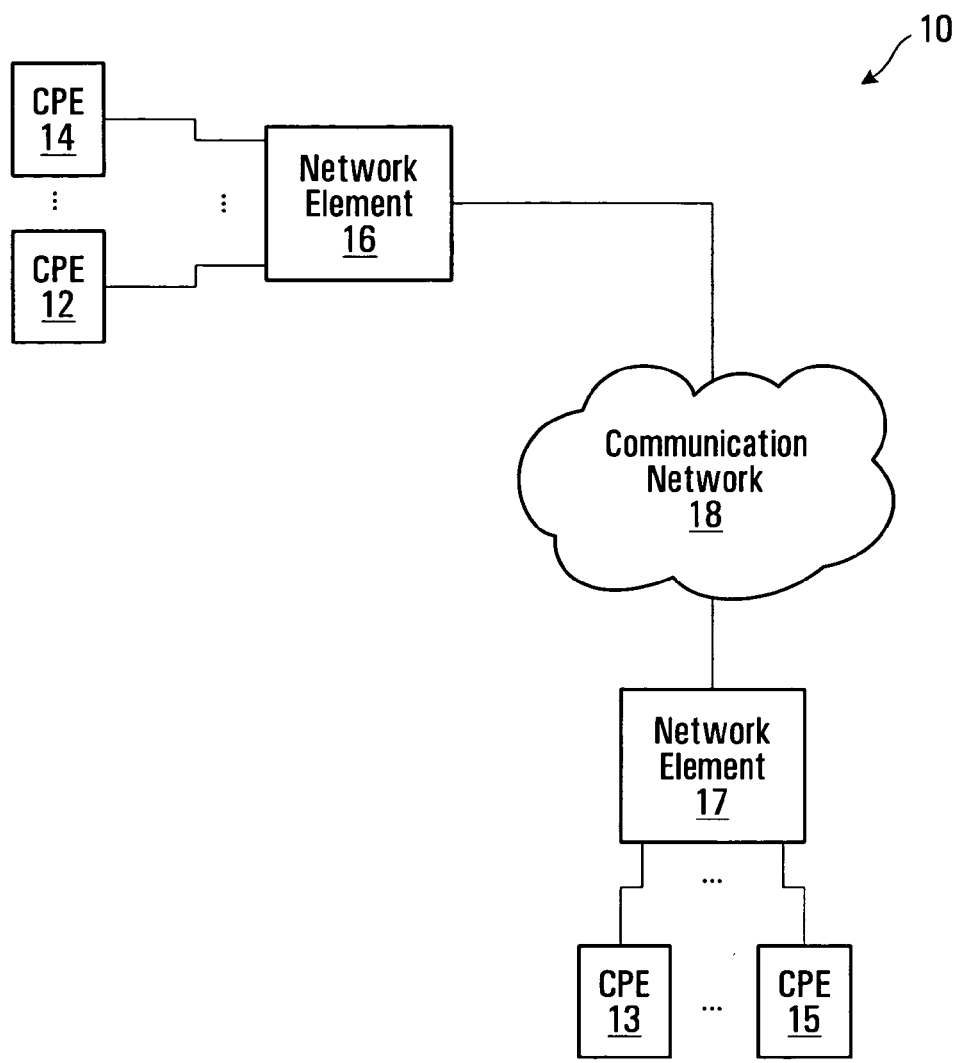
FIG. 1 is a block diagram of a communication system.

FIG. 1 is a block diagram of a communication system 10, in which embodiments of the invention may be implemented. The communication system 10 includes multiple CPE installations 12/14, 13/15, network elements 16, 17, and a communication network 18. Although only four CPEs 12/14, 13/15 and two network elements 16, 17 have been shown in FIG. 1 to avoid congestion, many more CPEs and network elements may be connected to the communication network 18. It should therefore be appreciated that the system of FIG. 1, as well as the contents of the other drawings, are intended solely for illustrative purposes, and that the present invention is in no way limited to the particular example embodiments explicitly shown in the drawings and described herein.

The CPEs 12/14, 13/15 represent communication equipment, illustratively end user communication devices, configured to receive and/or transmit communication signals. Although shown as being directly connected to the network elements 16, 17, it will be apparent that CPEs 12/14, 13/15 may communicate with the network elements 16, 17 through other intermediate components (not shown). In one embodiment, the CPE connections are local twisted pair loops used to establish DSL communication links.

Switches and routers are illustrative of the types of communication equipment represented by the network elements 16, 17. For example, where the CPE connections are DSL connections, the network elements 16, 17 may be DSLAMs, Advanced Service Access Multiplexers (ASAMs), or Intelligent Subscriber Access Managers (ISAMs). The network elements 16, 17 provide access to the communication network 18 for the CPEs 12/14, 13/15, and thus may be implemented within the communication network 18. However, the network elements 16, 17 have been shown separately from the communication network 18 in FIG. 1 for illustrative purposes.

The communication network 18, in addition to the network elements 16, 17, may also include other network elements which route communication signals through the communication network 18.

Many different types of end user, intermediate, and network communication equipment, as well as the operation thereof, will be apparent to those skilled in the art. In general, the network elements 16, 17 transfer communication signals between the communication network 18 and the CPEs 12/14, 13/15. According to one particular example implementation, the network elements 16, 17 communicate with other equipment in the communication network through Gig-E communication links, and communicate with the CPEs 12/14, 13/15 through DSL communication links. However, embodiments of the invention are not limited to any particular types of communication equipment, transfer mechanisms, or protocols. The architectures and techniques disclosed herein may be used in conjunction with other than Ethernet and DSL communication links.

As noted above, it may be desirable to locate communication network access equipment as close as possible to CPEs, to improve communications over DSL communication links for instance. In accordance with an embodiment of the invention, communication service is provided to a large number of CPEs from distributed access equipment, illustratively a distributed Very high bit rate DSL (VDSL) access node. This distributed equipment may be provided in the form of central host equipment and expansion equipment that is connected to the host equipment but distributed geographically within shorter distances from communication service subscribers.

Figure 2:
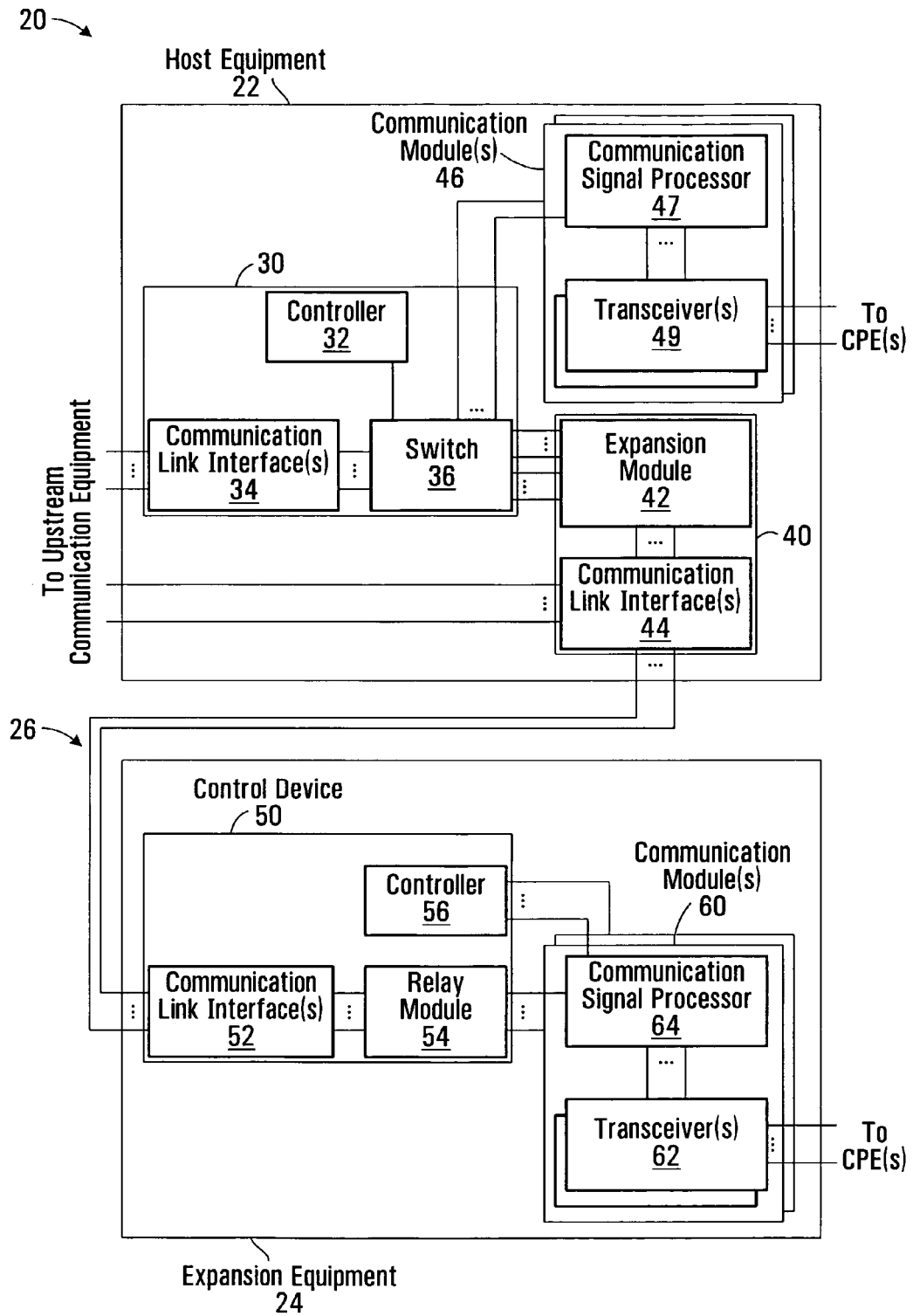
FIG. 2 is a block diagram of a distributed architecture according to an embodiment of the invention.

FIG. 2 is a block diagram of a distributed architecture according to an embodiment of the invention. The distributed equipment system 20 of FIG. 2 includes host equipment 22 and expansion equipment 24 which are operatively coupled to each other through one or more communication links 26.

The host equipment 22 includes one or more communication link interfaces 34 operatively coupled to a switch 36, and a controller 32 also operatively coupled to the switch 36. The form of the internal connections in the unit 30, and/or other internal connections in the equipment 22, 24, may vary between different implementations. In one embodiment, the communication link interface(s) 34, the switch 36, and the controller 32 are provided in an electronic circuit card 30 such as a Network Termination (NT) card, in which case the internal connections may be traces or other conductors on a card substrate. Those skilled in the art will be familiar with various examples of NT cards and other components which provide communication link interfaces, switches, and controllers.

An expansion module 42 is operatively coupled to one or more communication link interfaces 44, possibly in another electronic circuit card 40.

The switch 36 is also operatively coupled to one or more communication modules 46, which may be Line Termination (LT) cards, for example. Each communication module 46 includes a communication signal processor 47 and one or more transceivers 49. The transceivers 49 enable a communication module 46 to communicates with one or more CPE (s) through access communication links.

Interfaces to connections between the components 30, 40, 46 have not been separately shown in FIG. 2 to avoid congestion. However, it should be appreciated that interconnections between these components, like the internal connections noted above, may take any of various forms. Where the components 30, 40, 46 are provided as respective electronic circuit cards for installation in slots of an equipment shelf, for instance, interface elements on the components may enable inter-component communications through backplane conductors and physical connectors provided in card slots. Other implementations of inter-component interfaces are also possible. Thus, an interface that enables communications between components may include simply a conductor or other physical medium, a connector or other interface element for connecting to a physical medium, and/or possibly other elements which may have more "active" functions than creating a connection to physical medium.

The expansion equipment 24 includes a control device 50 and one or more communication modules 60. The control device 50 includes one or more communication link interface(s) 52, a relay module 54 operatively coupled to each communication link interface 52, and a controller 56. The relay module 54 and the controller 56 are operatively coupled to a communication signal processor 64 of each communication module 60. Each communication module 60 includes one or more transceivers 62 to enable communication with CPE(s) through access-side communication links.

Various forms of internal connections within the control device 50 and each communication module 60, as well as interfaces enabling communication between these components, are envisioned. Where the components 50, 60 are provided as an equipment control card and one or more LTs, for example, internal connections may be provided as traces or other conductors, and inter-component connections may be through backplane conductors or other connections provided in the expansion equipment 24.

The present invention is not limited to any particular types of the components shown in FIG. 2. Different communication equipment vendors may implement these components in different manners, for instance. The examples described below are intended solely for the purposes of illustration, and not to limit the scope of the invention in any way.

Upstream and downstream communication links, and thus the communication link interfaces 34, 44, 52, may be of similar or different types. In one embodiment, the communication link(s) to upstream communication equipment, such as switches/routers in a communication network core or a DSL CO, and the communication link(s) 26 to the expansion equipment 24 are Gig-E optical links, and the communication link interfaces 34, 44, 52 are SFP port devices.

The switch 36, illustratively a Local Area Network (LAN) switch, switches communication signals between upstream communication links and downstream communication links. This switching function may be under the control of the controller 32, although in other embodiments the switch 36 might not require inputs from the controller 32 for controlling the actual switching function. The switch 36 may itself be capable of accessing a routing table or other information to determine how communication signals received from the upstream communication link(s), the communication module (s) 46, and/or the expansion equipment 24 are to be switched. In this case, the controller 32 might be used to create/manage the routing table of the switch 36, but does not directly control the switching function of the switch.

The controller 32 is configurable to control at least the communication module(s) 46, and possibly other elements of the host equipment 22. Any or all of such control functions as enabling and/or disabling the communication module(s) 46, power control, testing, alarm monitoring, among others, may be performed by the controller 32. In order to avoid further congestion in FIG. 2, a separate control connection between the controller 32 and the communication module(s) 46 has not been explicitly shown. However, it should be appreciated that the controller 32 may communicate control information with the communication module(s) 46 via a separate control path.

In one embodiment, the controller 32 uses in-band signalling techniques to control the local communication module(s) 46, such that no dedicated control connections between the controller 32 and the local communication modules are required. As described in further detail below, in-band signalling is also used by the controller 32 to control the expansion communication module(s) 60 of the expansion equipment 24.

Implementations of the controller 32 may include hardware implementations, software implementations in which control software is stored in a memory (not shown) and executed by one or more processing elements such as a microprocessor, a microcontroller, an Application Specific Integrated Circuit (ASIC), and/or a Field Programmable Gate Array (FPGA), firmware implementations, or some combination thereof.

Each communication module 46 may include hardware, software, and/or firmware functional elements, represented by the communication signal processor 47 and the transceiver(s) 49, which process communication signals for transfer between the host equipment 22 and other communication equipment, illustratively CPEs. The communication module (s) 46 may have a substantially similar structure to the communication module(s) 60 of the expansion equipment 24. In one embodiment, both the host equipment 22 and the expansion equipment 24 use the same LT cards, although the LT card(s) in the expansion equipment may be configured somewhat differently, in particular to handle control information from the host equipment controller 32, as described in further detail below.

The control device 50 enables the host controller 32 to control one or more functions for the expansion equipment 24. According to an embodiment of the invention, control of the communication module(s) 60 ultimately rests with the controller 32. The control device 50, however, may participate in the control of the communication module(s) 60, in that its local controller 56 may actually carry out control functions based on control information received from the controller 32 and/or report control information such as testing results and alarm conditions back to the controller 32.

The relay module 54 represents a component that transfers communication signals, which may include communication traffic, control information, or both, from the communication link interface(s) 52 through the control device 50 and to the communication module(s) 60. Functions of the relay module 54 may include only a relay function, or possibly simple signal handling functions such as level conversion and/or optical/electrical signal conversion, for example. In some embodiments, the relay module 54 is implemented as simply one or more conductors providing a signal path between each communication link interface 52 and a corresponding communication module 60. According to one particular example implementation, each communication link interface(s) 52 is an SFP, which includes a signal converter for converting communication signals between optical signals communicated on the link(s) 26 and electrical signals passed by the relay module 54 to the communication module(s) 60.

Where more than one communication link interface 52 is provided, the relay module 54 provides multiple paths to the communication module(s) 60, as described in further detail below. In this case, there is preferably a one-to-one mapping between each communication link interface 52 and a corresponding communication module 60.

It should be noted that different implementations of the expansion equipment 24 are contemplated. According to one embodiment, substantially identical equipment shelves but different types of electronic circuit cards-are used to build the host equipment 22 and the expansion equipment 24. In other embodiments, however, the expansion equipment 24 is implemented as a sealed expansion module which includes a control device 50 and a single communication module 60. A sealed module might be used where communication network access is to be provided to a relatively small customer base that is not expected to grow significantly and can be serviced with a single communication module 60. As those skilled in the art will appreciate, a single LT card can support 24, 48, or more physical ports and access links. References herein to expansion systems and equipment should be interpreted accordingly.

As described in further detail below, the host controller 32 is the primary controller of the distributed system 20, and also connects to upstream communication equipment, illustratively a CO or other communication network elements in a communication network core. The host equipment 22 is the most complex and expensive part of the distributed system 20.

With the addition of a special unit 40, illustratively an electronic circuit card, the host equipment 22 can be connected to additional upstream communication links and/or to one or more installations of expansion equipment. The expansion equipment 24 contains another specially designed unit 50, possibly another electronic circuit card, that connects to one or more downstream expansion communication links from the host equipment 22 and acts as a shelf controller, although under the ultimate control of the controller 32.

In operation, the expansion module 42 transfers control information between the controller 32 of the host equipment 22 and the expansion communication link(s) 26. This enables control information to be exchanged between the host controller 32 and the expansion controller 56. Control information may include, for example, control messages destined for the controller 56 of the expansion equipment 24 to cause the controller 56 to perform a control function or possibly information such as monitored conditions, alarms, etc., gathered by the controller 56 and sent to the controller 32. According to one embodiment of the invention, control information destined for the expansion equipment controller 56 is transferred from the host equipment 22 to the expansion equipment 24 through the same communication link(s) 26 used to transfer communication traffic, also known as in-band control signalling. In this case, the controller 32 may inject control information in communication signals switched by the switch 36, provide control information to the switch 36 for switching in the same manner as communication traffic, or provide the control information to the expansion module 42 or the interface(s) 44 for insertion into communication signals to be transferred on the downstream communication link(s) 26. Communication signals may thus include control information, communication traffic, or both.

Through the expansion module 42, control information is thus exchanged with the expansion equipment 24, and in particular the expansion controller 56. This allows the controller 32 to control not only the local components which are provided in the host equipment 22, but also remote components of the expansion equipment 24. Complex control functions such as overall distributed equipment control, configuration, and management can be centralized at the host equipment 22, thereby simplifying the design and reducing the cost of the expansion equipment 24.

Transfer of control information between the host equipment 22 and the expansion equipment 24 can be thought of in one sense as effectively extending the backplane of the host equipment 22 to include the expansion equipment 24. The controller 32 may target the communication module(s) 60 of the expansion equipment 24 in substantially the same manner as it targets its local communication module(s) 46, using shelf, rack, port, and/or other addressing or identification information, for example. The controller 32 thus treats the communication modules 46, 60 in the same way, whether they are located in the host equipment 22 or in the distributed, separate expansion equipment 24.

Information used to address, target, or otherwise designate expansion equipment components may be manually configured by an equipment operator or other personnel, or in some cases automatically discovered by the controller 32. As described in the commonly assigned and co-pending United States patent application Ser. No. 11/264,476, entitled "INTEROPERABILITY OF NETWORK COMPONENTS HAVING DIFFERENT IDENTIFICATION SCHEMES", filed of even date herewith and incorporated in its entirety herein by reference, an identifier of a form used by the controller 32 may be assigned to expansion equipment components for which such identifiers are not normally used.

For in-band control signalling, the switch 36 switches control information destined for the expansion equipment 24 to a particular switch port which is connected to a downstream interface of the communication link interface(s) 44. The switch 36 may identify the correct switch port from a rack/shelf/port identifier provided by the controller 32, for instance.

The transfer of control information provides significant advantages in the system 20 in terms of simplifying the expansion equipment 24. Functions of the controller 56 can effectively be controlled by the controller 32, and accordingly the controller 56 may be a much simpler component than would otherwise be required to control the expansion equipment 24.

Communication traffic is also transferred between upstream communication links and the downstream communication link(s) 26 to the expansion equipment 24 in a substantially similar manner. The switch 36 switches incoming communication traffic to the local communication module(s) 46 directly and/or to the expansion communication module(s) 60 through the unit 40. The communication module(s) 46, 60, process the traffic and forward it on to CPE(s) through access communication links.

A communication link interface 44 may be a dedicated communication link interface which enables communication with an upstream communication link or a downstream communication link 26. According to another embodiment of the invention, the unit 40 may also or instead include one or more configurable communication link interfaces. A configurable communication link interface is configurable to enable communication with either upstream communication equipment through an upstream communication link, or with the expansion communication equipment through an expansion communication link. A single interface may thus be configured as an upstream interface or a downstream interface, in accordance with current and/or usage and requirements. This is described in further detail below with reference to FIG. 3.

At the expansion equipment 24, each of the communication link interface(s) 52 enables communication with the host equipment 22 through a respective communication link 26. Although referred to above as downstream communication link(s), the communication link(s) 26 connect to upstream equipment from the perspective of the expansion equipment 24. Thus, it should be appreciated that the characterization of the same communication links, and other components, may be different depending upon a point of view being considered. For example, the communication link(s) 26 may be considered downstream or access-side communication links from the perspective of the host equipment 22, but upstream or network-side communication links from the perspective of the expansion equipment 24. Similarly, a communication module 60 is local to the expansion equipment 24, but remote to the host equipment 22.

The relay module 54 transfers communication signals, which may include control information and/or communication traffic, between the link(s) 26 and the local communication module(s) 60.

According to an embodiment of the invention described in further detail below, transfer of communication signals through the control device 50 between the communication module(s) 60 and the host equipment 22 through the communication link(s) 26 might not involve substantial processing of communication signals. Each of the communication link interface(s) 52 and/or the relay module 54 may include such a component as a signal converter for converting between optical and electrical signals or performing other relatively simple signal handling functions, processing of communications is performed by a communication signal processor 64, thereby keeping the control device 50 very simple and inexpensive.

Communication signals may thereby effectively pass through the control device 50 without substantial processing of their content. A communication signal received from the host equipment 22, for example, is transferred to a communication module 60 for processing. The communication signal processor 64 of the communication module 60 then processes the communication signal, to determine whether the communication signal includes control information destined for the control device 50, and if so, forwards that control information back to the control device 50. In a similar manner, the controller 56 may communicate control information with the host equipment 22, and specifically its controller 32, in communication signals which are processed by the processor 64 of one or more of the communication module(s) 60 and transferred to the host equipment 22 through the relay module 54.

Therefore, in FIG. 2, a control path between the controller 32 and the controller 56 passes through the control device 50 on which the controller 56 resides, loops through an external communication signal processor 64, and then back to the control device 50. Control information, in the form of control messages, for example, are communicated between the host equipment 22 and the expansion equipment 24 over the same communication links that are used for communication traffic. These control messages are passed by the control device 50 to a communication signal processor 64, which identifies the control messages by accessing message or packet headers for instance, and passes them back to the control device 50, thereby saving the cost of providing dedicated communication link termination means in the control device. This approach may take advantage of a network processor and/or other processing capabilities of an LT card, for example, to terminate the communication link(s) 26. The control device 50 then does not require a network processor, a layer 2 LAN switch, or other complex and expensive components. This makes the control device 50 a very simple and inexpensive expansion equipment controller.

The controller 56 may also or instead send control information to the controller 32, as noted above. Control information originating with the controller 56 may include any or all of test results, monitored conditions, alarm conditions, etc. An alarm/testing module (not shown) may be provided in the expansion equipment 24 for collecting alarms and/or other types of control information to be reported to the controller 32 by the controller 56.

Re-use of the communication module(s) 60 in this manner may provide several advantages. The expansion equipment control device 50 can be an inexpensive component relative to control components required for implementing other distributed architectures, while still providing for a comparable level of control of the expansion equipment. The controller 56 may provide, for example, alarm control, alarm display, test access, communication module control, thermal defence to shut down communication modules and/or cut power responsive to an over-temperature condition, etc.

All of these functions of the expansion controller 56 are managed by the host controller 32 over the communication link(s) 26 normally used for communication traffic, illustratively one or more standard Gig-E communication links and associated interfaces 44, 52.

In terms of the actual interconnection between the control device 50 and the communication module(s) 60, the same or separate physical media may be used to exchange communication signals and control information. According to one embodiment, communication signals are transferred between the relay module 54 and each communication module 60 through a corresponding connection, illustratively a data bus provided in an equipment shelf, and control information is transferred between the controller 56 and the communication module(s) 60 through one or more different connections, illustratively a management interface between control device slot and LT slots provided on a backplane of the equipment shelf.

Another advantage of the communication signal processing arrangement described above is that control redundancy between the host equipment 22 and the expansion equipment 24 is provided without using additional physical components. Where multiple Gig-E links are provided at 26, for example, control information can be transferred between the host equipment 22 and the expansion equipment 24 over multiple paths.

In classical DSLAM products, for example, an extension shelf requires an expensive board for performing shelf-related control and data-gathering. Such an approach, while supporting equipment redundancy, tends to be extremely expensive. Moreover, during switchovers from an active to an inactive equipment/cable pair, the extension shelves suffer a direct communication traffic hit that may last minutes or longer, which can be particularly problematic for video services for instance.

According to an aspect of the invention, the expansion equipment 24 includes an inexpensive control device 50 such as a controller card having a controller 56 which assists the host controller 32. The host controller 32 might not directly communicate with the expansion controller 56. As described above, the host controller 32 may instead communicate with the expansion controller 56 via an interface between the controller 56 and a communication module 60. Providing multiple communication links 26, communication link interfaces 52, and communication modules 60 to carry communication traffic for different customers, for example, also provides control redundancy. It should be appreciated that control redundancy in this case does not necessarily add further cost to the system 20, since multiple communication links are often provided for communication equipment that services multiple customers. For example, multiple Gig-E links 26 may already be provided for communication traffic purposes, and thus sharing those links for control purposes provides redundancy to control communications without adding extra cost.

In one embodiment, a communication signal processor 64 of each communication module 60 processes communication traffic for a corresponding communication link 26. The relay module 54 may thus pass communication signals between corresponding communication link interfaces 52 and communication modules 60, preferably through respective separate connections.

The communication module(s) 60 need not actually interpret control information destined for the controller 56. Although the communication module(s) 60 would process received communication signals to determine whether those signals include such control information, actual interpretation of that control information is a function of the controller 56. The controller 56 may perform a control function in response to an instruction received from the host controller 32, for example. In the opposite direction, the communication module(s) 60 may receive control information from the controller 56 and generate communication signals including that control information for transmission to the host equipment 22, but need not otherwise process the control information.

In general, there are as many redundant control paths between the host controller 32 and the expansion controller 56 as there are communication links 26 and communication modules 60, provided all links and modules are operational. If one communication link, module, or other component of a communication path fails, then the host controller 32 may still communicate with the expansion controller 56 via another communication link and module, thereby providing expansion equipment control redundancy.

Any of several techniques may be used to transfer control information between the host controller 32 and the expansion controller 56 through the redundant communication paths. One of the communication modules 60 could be designated a primary module to identify control information in received communication signals and forward that control information to the expansion controller 56. In the event that the primary module fails or is removed, then another primary module can be designated.

Another possibility would be to have all communication modules 60 process received communication signals and forward control information to the controller 56. The controller 56 would then be responsible for detecting and discarding any duplicates of the same control information received from multiple communication modules.

The same or a different approach could be used for communication of control information in the other direction, from the expansion controller 56 to the host controller 32. In one embodiment, only one communication module 60 transfers received control information to the controller 56, but the controller 56 sends control information to all of the communication modules 60 for transfer to the host controller 32. The host controller 32 then selects one copy of the received control information and discards any other copies.

From the foregoing, it will be apparent that each communication module 60 communicates with the control device 50 and is adapted for processing communication signals which are received from or are to be transmitted to the host equipment 22 through the control device. Control information is exchanged between the host controller 32 and the expansion controller 56 through the communication module(s) 60 and the control system 50. Control redundancy is provided by installing multiple communication modules 60 and corresponding communication link interfaces 52 at the expansion equipment 24.

Advantages of providing control redundancy as disclosed herein may include, for example, a cost advantage where communication links installed to carry communication traffic are also used for control information. This type of control redundancy has the additional advantage of being independent of any particular communication link 26 or module 60. Unless every communication module 60 fails or is removed, the host controller 32 will have control over the expansion equipment 24.

The host controller 32 can instruct the expansion controller 56 to reset or power-down a failing communication module 60, due to heat or other hardware related problems for instance, without disrupting the operation of any other communication module(s) 60. Any failure or operational problems on one communication module 60 do not impact control of the expansion equipment 24, as another communication module 60 can take over, or may already be performing, control information transfer functionality without causing any hits on control functions.

In the event that no operational communication modules remain in the expansion equipment 24, then the host controller 32 is unable to communicate control information with the expansion controller 56. However, in this case, control of the expansion equipment 24 is no longer needed.

In addition to the control loop functions disclosed herein, a communication module 60 may perform other functions such as terminating an access-side communication link to CPE(s), to provide the CPE(s) with access to a communication network to which the host equipment 22 is connected. This type of function is represented in FIG. 2 by the transceiver(s) 62, numerous examples of which will be readily apparent to those skilled in the art.

Referring again to the host equipment 22 and particularly to the communication link interface(s) 44, communication equipment typically implement only dedicated network-side and access-side communication link interfaces. This assumes fixed network and access requirements, and does not allow for dynamic provisioning of network versus access interfaces.

As shown, the unit 30, illustratively an NT card, in the host equipment 22 may offer multiple communication link interfaces 34 for network connectivity. Under certain service provider network deployments, the number of communication link interfaces 34 provided by the unit 30 might be not sufficient. The unit 40 offers one or more additional communication link interface(s) 44. In one embodiment, the communication link interface(s) 44 include two Gig-E interfaces for connection towards the network, and another two Gig-E interfaces that are configurable to be either connected towards the network or towards the expansion equipment 24.

In this example, the configurable interface capability may be used to avoid the addition of two physical connectors to the unit 40, realizing both cost and space savings. Instead of providing four dedicated connectors, including two for upstream communication links and two more for downstream communication links, only two connectors are provided for the two configurable interfaces. It should be appreciated that more or fewer than two configurable interfaces may be provided, and that each configurable interface may be configured independently of other dedicated and/or configurable interfaces.

Figure 3:
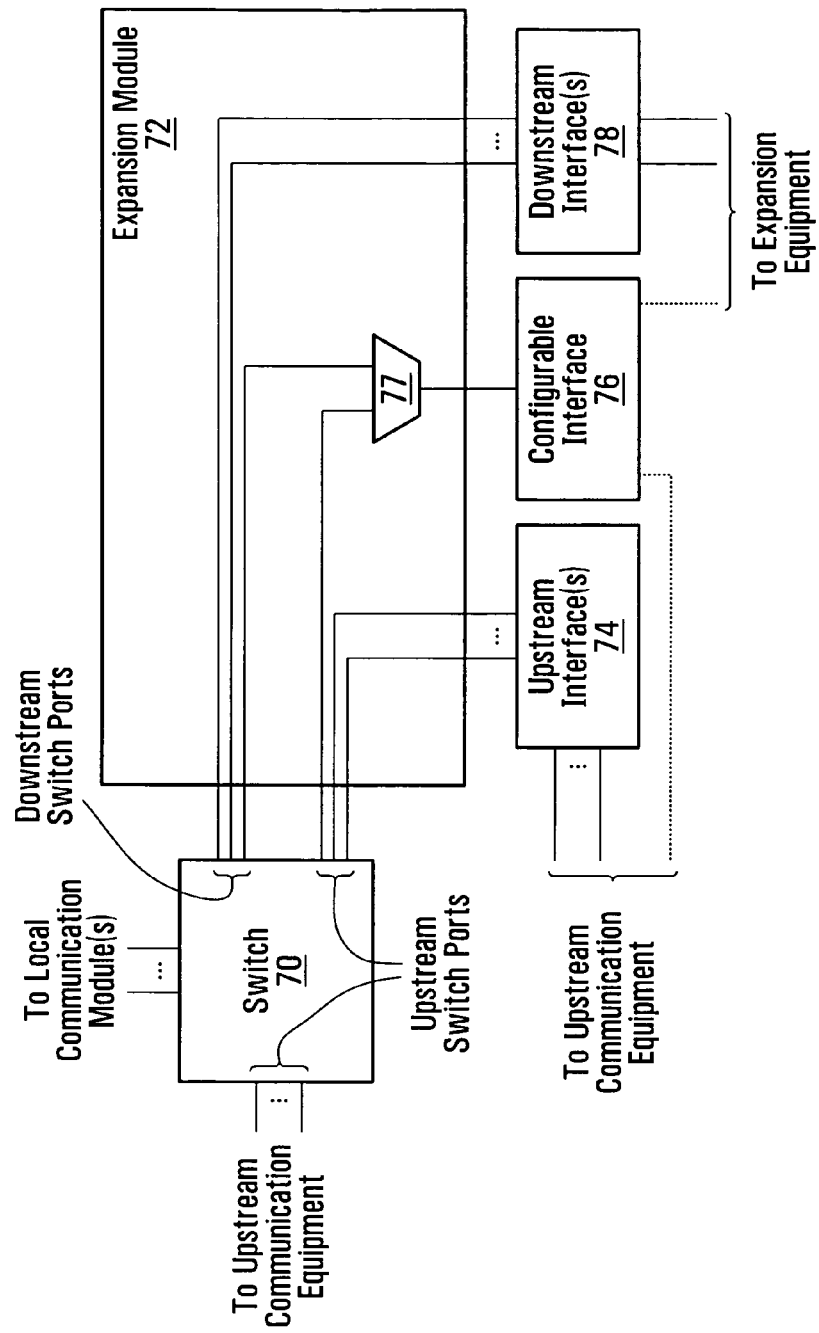
FIG. 3 is a block diagram illustrating connections between a switch and communication link interfaces.

FIG. 3 is a block diagram illustrating connections between a switch and communication link interfaces. The switch 70 and the expansion module 72 may be provided as the switch 36 and the expansion module 42 of the system 20 of FIG. 2, for example.

The switch 70 switches signals between its switch ports, which may be connected to upstream communication links or downstream communication links. In FIG. 3, different types of expansion communication link interface are separately shown. Expansion communication link interfaces may include any or all of these types of communication link interface.

The expansion communication link interfaces include one or more upstream interfaces 74 for connection to respective upstream communication links and upstream ports of the switch 70, one or more downstream interfaces 78 for connection to respective downstream communication links and downstream ports of the switch 70, and one or more configurable interfaces 76, only one of which is shown in FIG. 3. The configurable communication link interface 76 is configurable for connection to either an upstream communication link or a downstream communication link.

As shown, the configurable interface 76 is operatively coupled to a pair of switch ports, including one upstream port and one downstream port, through the selector 77. The selector 77 may be a controllable switch, a muliplexer, or some other component which is configurable to operatively couple one of the pair of switch ports to the configurable interface 76. The selector 77 may have a default setting which is changed if necessary during provisioning of communication services, when a service provider decides whether an additional upstream or downstream communication link is desired.

It should be appreciated that the selector-based implementation of a configurable interface as shown in FIG. 3 is not the only possible embodiment of this feature. Providing a separate controllable component, namely the selector 77, outside the switch 70 allows the interface 76 to be configured for either upstream or downstream communications without affecting the structure and function of the switch 70. In another embodiment, the switch 70 itself is configurable, in which case a configurable interface could be connected to only a single switch port. Configuration of the interface as an upstream interface or a downstream interface then involves configuring the switch 70 to handle the port as either an upstream port or a downstream port.

Although not shown in FIG. 3, configuration of the selector 77 to connect an upstream or a downstream switch port to the configurable interface 76 may be performed through the host controller 32 (FIG. 2), or possibly through other means associated with the host equipment 22.

A configurable interface such as 76 provides for much more flexibility than having only dedicated network-side and access-side communication link interfaces. A reduction in the number of physical connectors for an expansion device including the expansion module 72 and the interfaces 74, 76, 78 may also result in a less crowded connection structure. Physical space may be limited, for example, on an electronic card faceplate. Costs can similarly be lowered in that fewer physical components and supporting circuitry are required.

As shown in FIG. 3, implementation of configurable interfaces does not preclude the use of dedicated interfaces. In one embodiment, the switch 70 is a 24-port switch, the host equipment provides three fixed upstream communication link interfaces, and the expansion interfaces include two dedicated upstream communication link interfaces 74, two configurable communication link interfaces 76, and ten dedicated downstream communication link interfaces 78.

Figure 4:
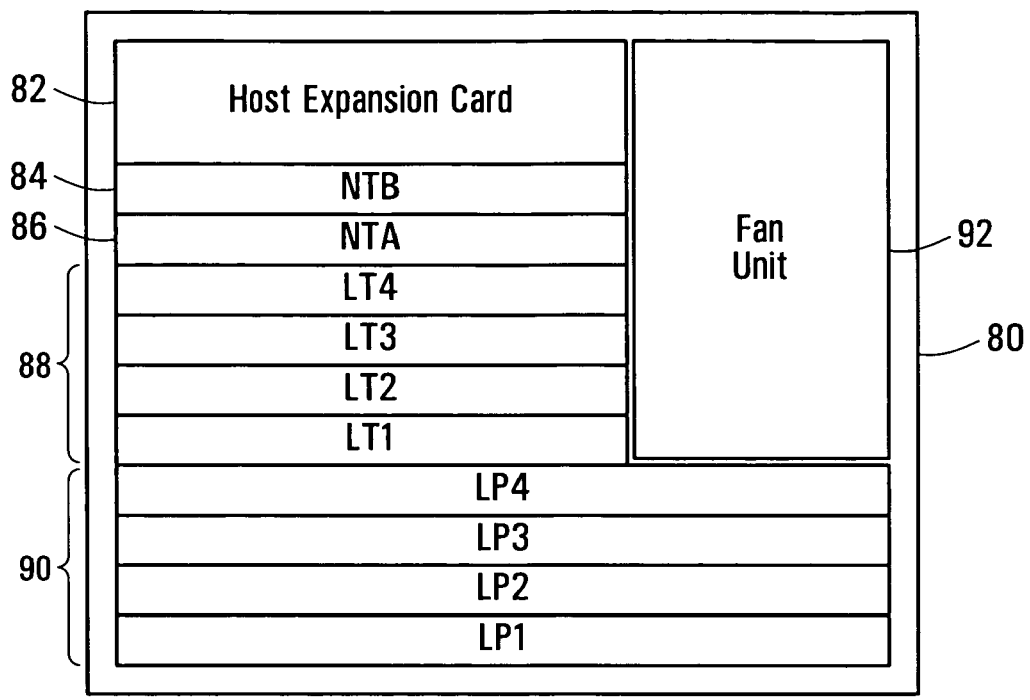
FIG. 4 is a block diagram illustrating a physical layout of a host system equipment shelf.

FIG. 4 is a block diagram illustrating a physical layout of a host system equipment shelf. The shelf 80 provides slots for receiving electronic circuit cards of different types. A host expansion card including the components 40 of FIG. 2 is shown in one slot at 82, slots 84, 86 include redundant NT cards which include the components 30 of FIG. 2, four LT cards are shown in slots 88, and four Low Pass (LP) filter cards are shown in the slots 90. A fan unit location is also shown at 92, and illustrates that an equipment shelf may provide slots of different sizes, accommodate cards with different temperature and possibly other requirements, and include components other than electronic circuit cards. The present invention is in no way limited to the particular layout, types, and numbers of cards, slots, or other components shown in FIG. 4. Further, fewer, or different cards, slots, and/or other components may be provided in a similar or different layout.

Figure 5:
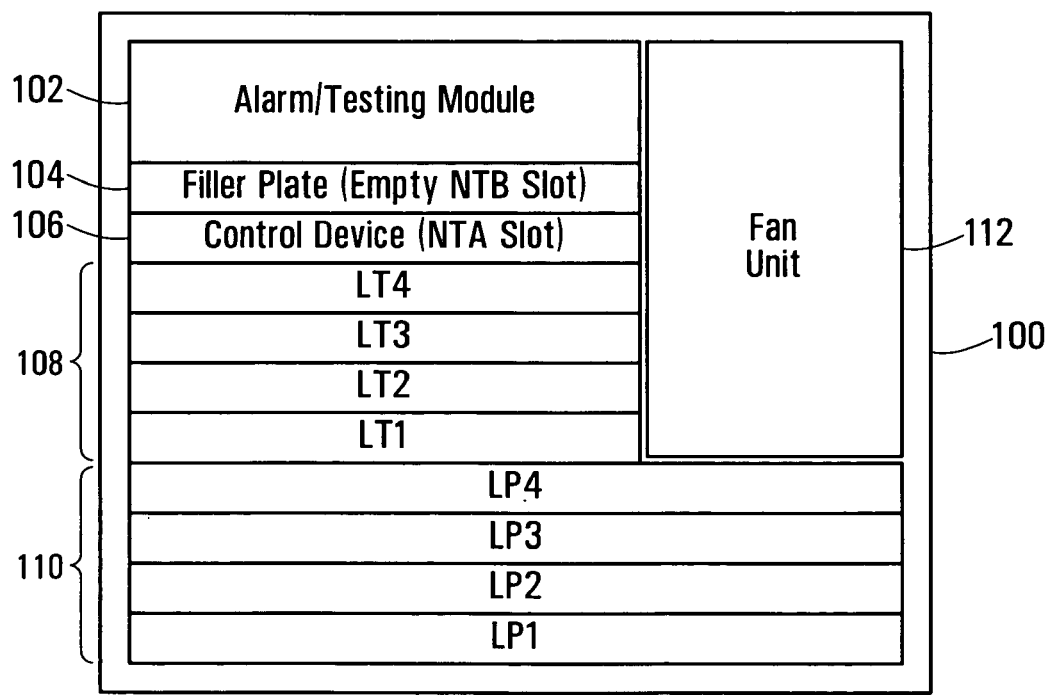
FIG. 5 is a block diagram illustrating a physical layout of an expansion system equipment shelf.

FIG. 5 is a block diagram illustrating a physical layout of an expansion system equipment shelf. According to an embodiment of the invention, the slot layouts of a host system equipment shelf and an expansion system equipment shelf are identical. This allows for a simple migration of an expansion system to become a host system.

From a comparison of FIGS. 4 and 5, it will be observed that the layouts of LTs in slots 88, 108, LPs in slots 90, 110, and fan units at 92, 112 is identical between the host system shelf 80 and the expansion system shelf 100. Although the slot layouts at 82/102, 84/104, and 86/106 are also identical, different types of cards are installed in these slots in an host system shelf 80 and an expansion system shelf 100. In particular, an alarm/testing module, described briefly above, is provided in the slot 102 instead of a host expansion card, one of the NT slots 104 contains a filler plate, and the other NT slot 106 contains a card which includes a control device, such as the control device 50 (FIG. 2).

The operation of the components installed in the shelves 80, 100 has been described in detail above.

Although described above primarily in the context of distributed systems, other embodiments of the invention are also contemplated. FIGS. 6-8, for example, are flow charts representing methods according to embodiments of the invention.

Referring to FIG. 6, there is shown a method 120 of constructing a host system of a distributed communication equipment architecture. The method 120 begins at 122 with providing a communication equipment shelf which includes slots for receiving electronic circuit cards. A controller card, illustratively an NT card, is installed in one slot at 124, and a host expansion card is installed in another slot at 126.

It should be appreciated that the method 120 may include additional steps, such as installing any or all of a second NT card, one or more LT cards, one or more LP cards, and/or different types of cards and other components. Of course, the order in which various cards are installed may also be different than shown.

In the case of converting an expansion system to a host system, the equipment shelf provided at 122 would already have different cards installed in the first slot, the second slot, and possibly other cards in at least some of the slots. As shown in FIG. 5 and described above, for example, an expansion shelf in one embodiment has a control card which includes a control device installed in an NT card slot and an alarm/testing unit installed in a host expansion card slot. In this case, cards in some or all slots may be removed and replaced with a host controller card and a host expansion card. Other cards may or may not also be replaced. The same LT and LP cards in an expansion system shelf, for instance, may also be used after the expansion system is converted to a host system. After the conversion, an expansion shelf may remain connected to its previous host system, in a subtending-type arrangement, or one or more communication link interfaces of the converted expansion system could instead be connected directly back to a CO or other communication equipment upstream of the previous host system.

FIGS. 7 and 8 illustrate methods of communicating control information between host and expansion controllers. The method 130 represents communication of control information in the host to expansion controller direction, and begins at 132 with an operation of receiving a communication signal at a control device of the expansion system. The communication signal originates with the host system and may include communication traffic, control information, or both.

At 134, the received communication signal is transferred to a communication module of the expansion system. The communication module processes the received communication signal at 135 to determine whether the received communication signal contains control information destined for the control device. If so, the control information is forwarded from the communication module to the control device at 136. Processing of communication traffic in the received signal may proceed at 138, to communicate the traffic to access communication links, for example.

Communication of control information in the opposite direction, from the expansion controller to the host controller, is represented by the method 140. Control information is received at the communication module, or possibly multiple communication modules, from the expansion control device at 142. The communication module then generates a communication signal including the control information at 144, and transmits the generated communication signal through the control device to the host system at 146.

As noted above for the method 120, variations of the methods 130 and 140 are also contemplated. For example, the operations shown in FIGS. 7 and 8 may be performed in any of various ways, some of which have been described above. Additional operations may also be performed. The expansion control device may control a function associated with the expansion system based on the control information extracted from a received communication signal and returned to it by the communication module at 136. Also, although reference is made in FIGS. 7 and 8 to a single communication signal and communication module, there may be multiple communication links between a host system and an expansion system and multiple communication modules at the expansion system. In this case, multiple communication signals may be exchanged in either or both of the host to expansion controller direction and the expansion to host controller direction.

It should therefore be apparent that methods according to other embodiments of the invention may include further, fewer, or different operations, performed in a similar or different order, than explicitly shown in FIGS. 7 and 8.

The architectures and techniques disclosed herein can be employed to provide a low-cost, efficient distributed access network architecture, for subscriber areas where distance from subscribers to central office equipment is outside of VDSL range, for example. Expansion equipment is controlled from host equipment, which can significantly reduce both capital and operational costs associated with distributed communication equipment.

Using a distributed architecture, a large number of subscribers can be served from the same access node. Expansion equipment, such as expansion shelves and SEMs, can offer VDSL service to smaller regions for better reach by allowing access equipment to be deployed closer to subscriber locations.

Similar physical structures between host and expansion equipment allows expansion equipment to be converted to host equipment with electronic card changes, which can be an important feature for network scalability.

Configuration of network/expansion communication links of host communication equipment, in the context of a distributed access network for example, can also be provided. This allows flexibility in the configuration of communication links between the host equipment and expansion equipment and between the host equipment and a core network as required or desired. This flexibility can also be important for network scalability, in that it may be used to provide service to a large coverage area in low cost manner, and to allow access equipment to be expanded, cost effectively, to increase coverage in an area as demand for services in that area grows.

In terms of control, expansion equipment control may be provided through the same communication links used for communication traffic. This may also provide the advantage of control redundancy in deployments where multiple communication links connect host equipment to expansion equipment. Control redundancy in this case does not require additional dedicated control communication links, and thus reduces extra component costs which would otherwise be incurred to provide control redundancy. As those skilled in the art will appreciate, control redundancy can be important to achieve high service availability.

What has been described is merely illustrative of the application of principles of embodiments of the invention. Other arrangements and methods can be implemented by those skilled in the art without departing from the scope of the present invention.

For example, it should be appreciated that the drawings represent illustrative embodiments of the invention. Other components and/or different connections than those explicitly shown may be provided without departing from the invention. The units 30, 40, 50, 60 in FIG. 2 for instance may include further functional modules which have not been shown in order to avoid congestion. The division of functions represented in FIG. 2 are also illustrative. Functions performed by separate components in FIG. 2, for example, may be performed by a single component in other embodiments. Further division of functions between more functional components than shown is also possible. Thus, systems incorporating embodiments of the invention may include further, fewer, or different components connected in a similar or different manner than explicitly shown in FIGS. 1-3.

In addition, although shown as separate equipment in FIG. 2, the host equipment and the expansion equipment need not be deployed at physical locations which are separated by any particular distance. A host system and an expansion system may be deployed at the same location to serve a large number of subscribers, for example. In one embodiment, host equipment and expansion equipment can accommodate four LT cards each, such that both host and expansion equipment could be deployed in particularly dense service areas requiring more access links than can be supported by four LT cards.

It should also be appreciated that distributed equipment may include more than one installation of expansion equipment. Considering example embodiments described above, a host system with an expansion module might support up to twelve expansion links, whereas a SEM includes one LT card and expansion systems might have up to only four LT cards each. In this case, a single host system could service one SEM per expansion link, multiple expansion shelves, each using one to four expansion links, or some combination of SEMs and expansion shelves.

We claim:

1. An apparatus comprising:
    an interface for enabling communication of control information with a controller, the controller being for exchanging control information with a local controllable communication module of communication equipment, the interface further enabling exchange of communication signals with the local controllable communication module and with an upstream communication link through which the communication equipment communicates with upstream communication equipment;
    an expansion module operatively coupled to the interface for transferring control information between the controller and a controllable communication module of expansion communication equipment and for transferring communication signals between the upstream communication link and the expansion communication equipment; and
    a configurable communication link interface operatively coupled to the expansion module, the configurable communication link interface enabling provisioning of a further upstream communication link for communication between the communication equipment and the upstream communication equipment and provisioning of an expansion communication link for communication between the communication equipment and the expansion communication equipment,
    the expansion module transferring communication signals between the communication equipment and the upstream communication equipment through the configurable communication link interface and the further upstream communication link where the further upstream communication link is provisioned at the configurable communication link interface, and transferring control information and communication signals between the communication equipment and the expansion communication equipment through the configurable communication link interface and the expansion communication link where the expansion communication link is provisioned at the configurable communication link interface.

2. The apparatus of claim 1, further comprising:
a dedicated upstream communication link interface for enabling communication with the upstream communication equipment through the upstream communication link.

3. The apparatus of claim 1, further comprising a plurality of interfaces of one or more of the following types:
a dedicated upstream communication link interface for enabling communication with the upstream communication equipment through the upstream communication link; and
a dedicated downstream communication link interface for enabling communication with the expansion communication equipment through a further downstream communication link.

4. The apparatus of claim 1, implemented in a host system of a distributed communication network element, the distributed communication network element comprising:
an expansion system comprising the expansion communication equipment; and
a communication link between the host system and the expansion system.

5. The apparatus of claim 4, wherein the host system and the expansion system comprise respective equipment shelves, the equipment shelves having a common structure.

6. The apparatus of claim 5,
wherein the host system comprises:
a first electronic circuit card of a first type, comprising the interface and the expansion module; and
a second electronic circuit card of a second type, comprising the controller, and
wherein the expansion system is convertible into another host system by installing in the expansion system equipment shelf respective electronic circuit cards of the first and second types.

7. The apparatus of claim 4, wherein the expansion system comprises:
a communication link interface operatively coupled to the communication link between the host system and the expansion system; and
a relay module operatively coupled to the communication link interface for transferring control information between the host system and the controllable communication module.

8. A method comprising:
providing a communication equipment shelf, the communication equipment shelf comprising slots for receiving electronic circuit cards;
installing in a first slot of the communication equipment shelf an electronic circuit card of a first type comprising a controller for exchanging control information with a local controllable communication module installed in another slot of the communication equipment shelf; and
installing in a second slot of the equipment shelf an electronic circuit card of a second type, the electronic circuit card of the second type comprising:
an interface for enabling communication of control information with the controller and for enabling exchange of communication signals with the local controllable communication module and with an upstream communication link through which the communication equipment shelf communicates with upstream communication equipment;
an expansion module operatively coupled to the interface for transferring control information between the controller and a controllable communication module of expansion communication equipment and for transferring communication signals between the upstream communication link and the expansion communication equipment; and
a configurable communication link interface operatively coupled to the expansion module, the configurable communication link interface enabling provisioning of a further upstream communication link for communication between the communication equipment shelf and the upstream communication equipment and provisioning of an expansion communication link for communication between the communication equipment shelf and the expansion communication equipment,
the expansion module transferring communication signals between the communication equipment shelf and the upstream communication equipment through the configurable communication link interface and the further upstream communication link where the further upstream communication link is provisioned at the configurable communication link interface, and transferring control information and communication signals between the communication equipment shelf and the expansion communication equipment through the configurable communication link interface and the expansion communication link where the expansion communication link is provisioned at the configurable communication link interface.

9. The method of claim 8, wherein providing comprises providing an expansion communication equipment shelf having installed in the first slot an electronic circuit card of a third type comprising:
a communication link interface for enabling communication with remote communication equipment through a communication link, the remote communication equipment comprising a controller for exchanging control information with a controllable communication module of the remote communication equipment; and
a relay module operatively coupled to the interface of the electronic circuit card of the third type for transferring control information between the controller of the remote communication equipment and a local controllable communication module associated with the communication link interface of the electronic circuit card of the third type,
the method further comprising:
removing the electronic circuit card of the third type from the first slot before installing the electronic circuit card of the first type in the first slot.

10. The method of claim 9, wherein the remote communication equipment exchanges communication traffic with the upstream communication equipment, wherein one or more of the electronic circuit card of the first type and the electronic circuit card of the second type comprises a communication link interface for enabling communication through an upstream communication link, and wherein the method further comprises:

operatively coupling the communication link interface of the one or more of the electronic circuit card of the first type and the electronic circuit card of the second type to the upstream communication equipment.

11. An apparatus comprising:

an expansion module for transferring communication signals between communication equipment and upstream communication equipment, and between the communication equipment and downstream communication equipment; and a plurality of communication link interfaces operatively coupled to the expansion module, at least one of the plurality of communication link interfaces comprising a configurable communication link interface that enables provisioning of an upstream communication link for communication with the upstream communication equipment and a downstream communication link for communication with the downstream communication equipment, the expansion module transferring communication signals between the communication equipment and the upstream communication equipment through the configurable communication link interface and the upstream communication link where the upstream communication link is provisioned at the configurable communication link interface, and transferring communication signal between the communication equipment and the downstream communication equipment through the configurable communication link interface and the downstream communication link where the downstream communication link is provisioned at the configurable communication link interface.

12. The apparatus of claim 11, wherein the plurality of communication link interfaces further comprises one or more of:

a dedicated upstream communication link interface, operatively coupled to the expansion module, for enabling communication with the upstream communication equipment through a farther upstream communication link, the expansion module transferring communication signals between the communication equipment and the upstream communication equipment through the dedicated upstream communication link interface and the further upstream communication link; and a dedicated downstream communication link interface, operatively coupled to the expansion module, for enabling communication with the downstream communication equipment through a further downstream communication link, the expansion module transferring communication signals between the communication equipment and the downstream communication equipment through the dedicated downstream communication link interface and the further downstream communication link.

13. The apparatus of claim 11, further comprising:

a switch for switching communication signals between upstream switch ports and downstream switch ports, wherein the configurable communication link interface is operatively coupled to an upstream switch port and a downstream switch port of the switch.

14. The apparatus of claim 13, further comprising:

a selector operatively coupled between the configurable communication link interface and the switch, the selector selectively operatively coupling the upstream switch port of the switch to the configurable communication link interface where the upstream communication link is provisioned at the configurable communication link interface, and operatively coupling the downstream switch port of the switch to the configurable communication link interface where the downstream communication link is provisioned at the configurable communication link interface.

15. The apparatus of claim 11, further comprising:

a switch for switching communication signals between upstream communication links and downstream communication links, wherein the configurable communication link interface is operatively coupled to the switch, wherein the switch switches communication signals associated with the configurable communication link interface between a downstream communication link and the configurable communication link interface where the upstream communication link is provisioned at the configurable communication link interface, and switches communication signals associated with the configurable communication link interface between an upstream communication link and the configurable communication link interface where the downstream communication link is provisioned at the configurable communication link interface.

* * * * *

UNITED STATES PATENT AND TRADEMARK OFFICE
CERTIFICATE OF CORRECTION

PATENT NO. : 7,583,689 B2  Page 1 of 1
APPLICATION NO. : 11/264475
DATED : September 1, 2009
INVENTOR(S) : Aboukarr et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 690 days.

Signed and Sealed this

Fourteenth Day of September, 2010

David J. Kappos
*Director of the United States Patent and Trademark Office*